May 26, 1953
A. MOESSINGER
2,639,732
WEAVING MACHINERY AND CONTROL
Filed Aug. 8, 1947
6 Sheets-Sheet 2
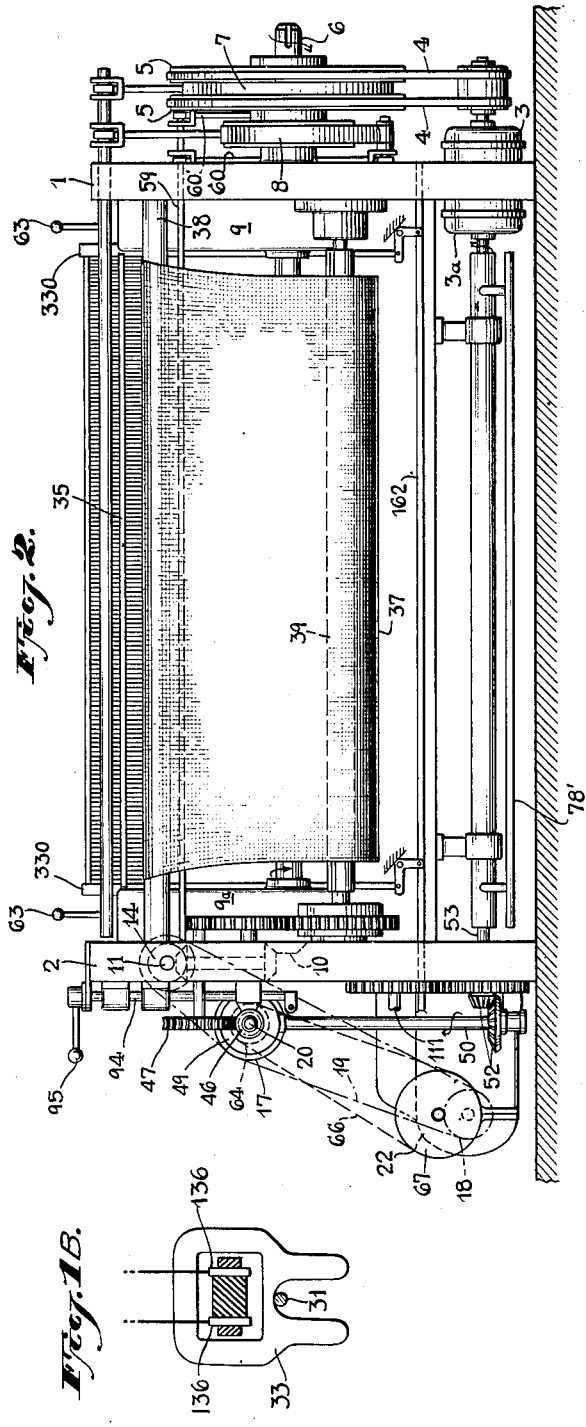
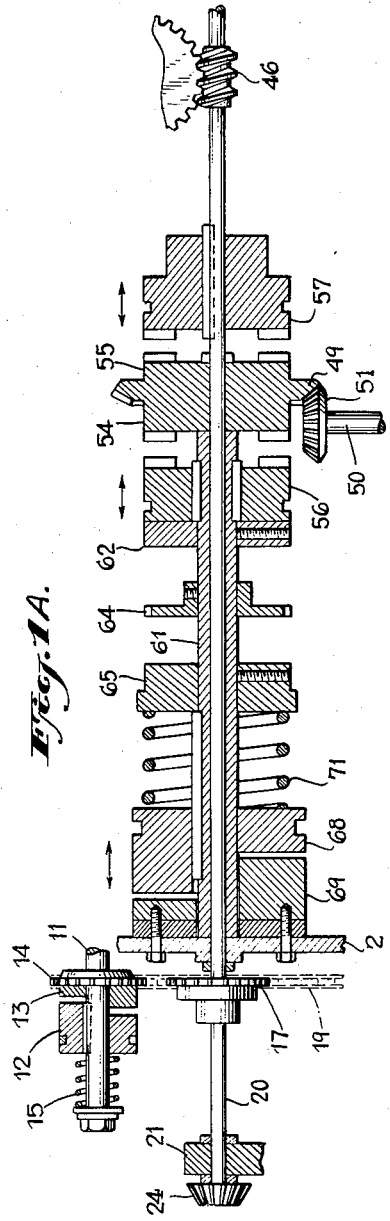
INVENTOR.
ALBERT MOESINGER
BY
ATTORNEY.

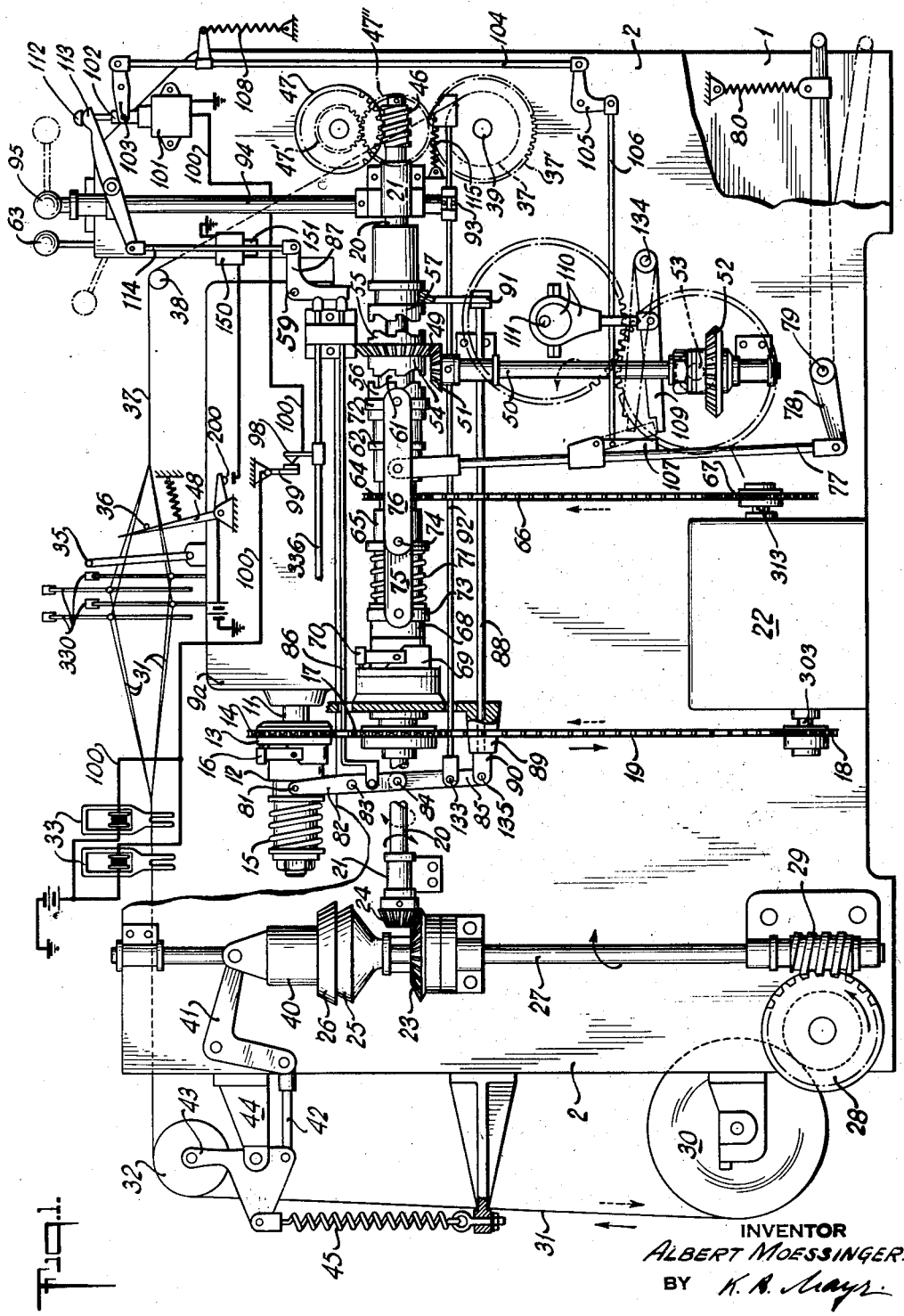

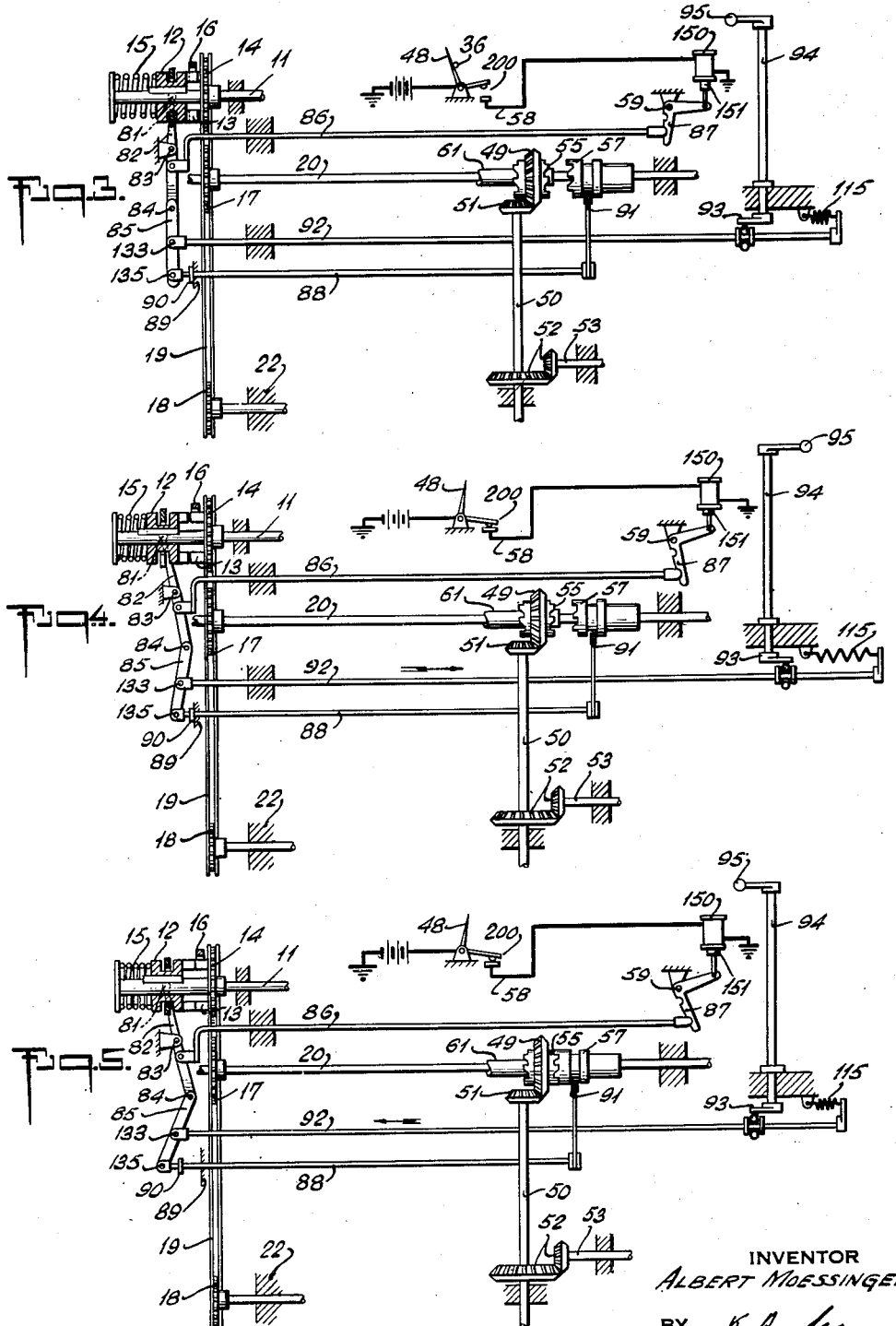

May 26, 1953 A. MOESSINGER 2,639,732
WEAVING MACHINERY AND CONTROL
Filed Aug. 8, 1947 6 Sheets-Sheet 4
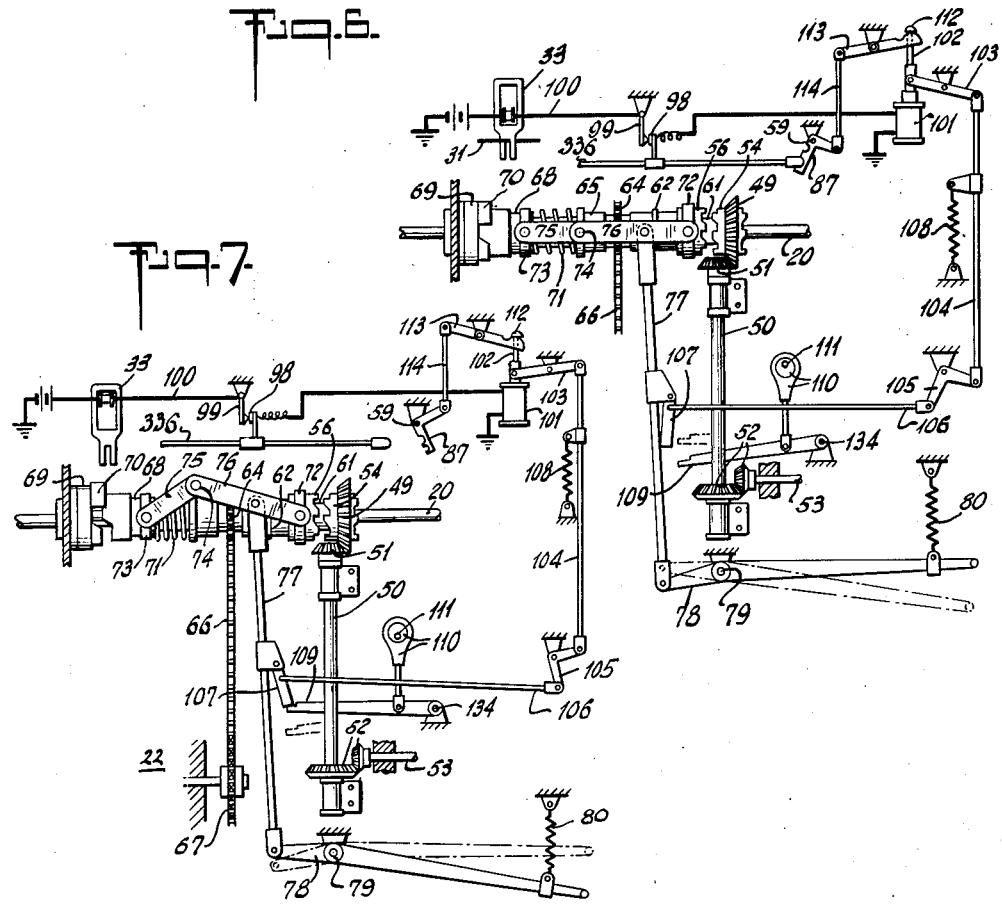
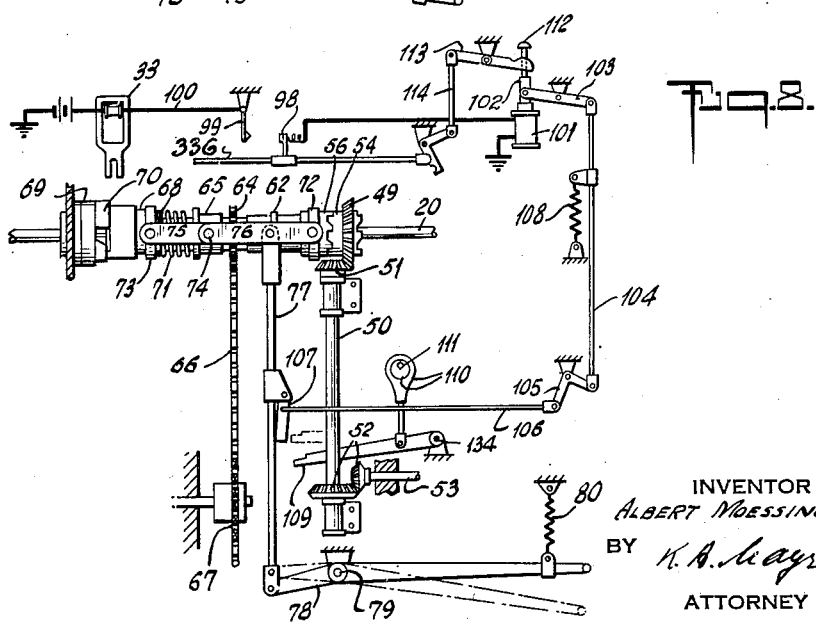
INVENTOR
ALBERT MOESSINGER
BY
ATTORNEY

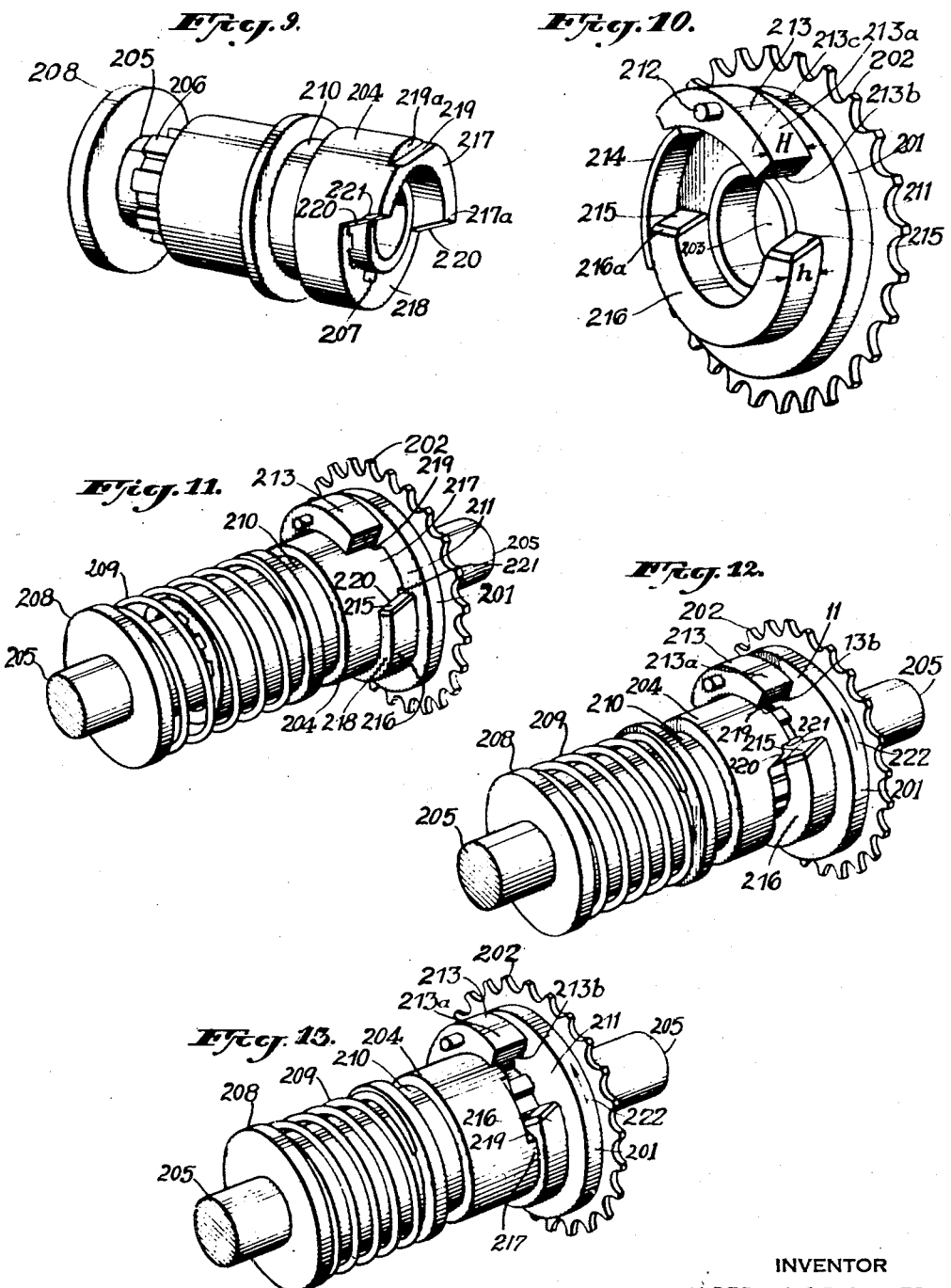

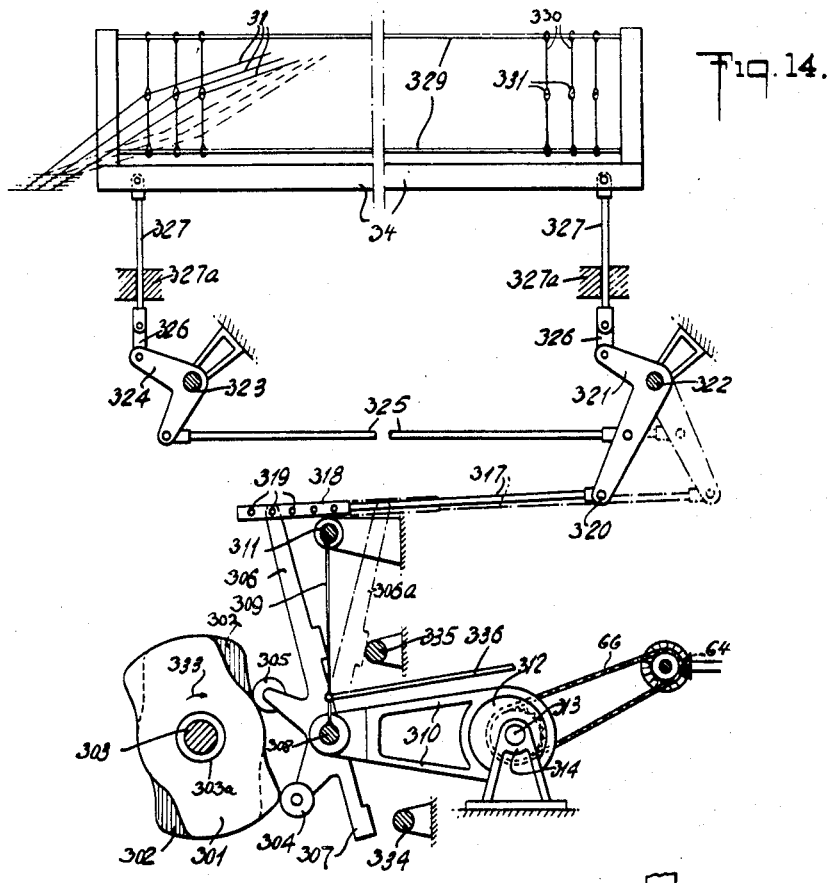
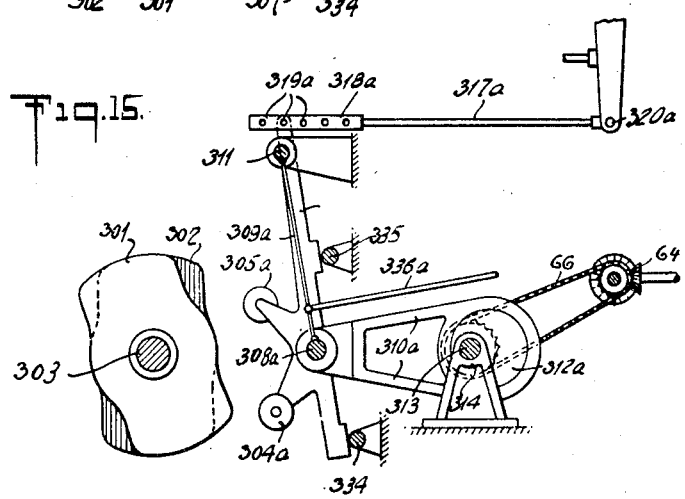

Patented May 26, 1953

2,639,732

UNITED STATES PATENT OFFICE 2,639,732

WEAVING MACHINERY AND CONTROL

Albert Moessinger, Winterthur, Switzerland, assignor to Sulzer Freres, Societe Anonyme, Winterthur, Switzerland Application August 8, 1947, Serial No. 767,418
In Switzerland March 5, 1945

Section 1, Public Law 690, August 8, 1946
Patent expires March 5, 1965

13 Claims. (Cl. 139—1)

The invention relates to a method and a machine for executing auxiliary motions on textile machines when rectifying irregularities as, for example, in looms when thread failures occur.

According to the invention, the method consists in interrupting normal drive of the machine, uncoupling parts of the machine which must be moved for correcting failures and thereupon coupling these parts to an auxiliary drive.

In a machine for performing the method, at least one pair of clutches is provided, one being effective during normal manufacturing operation and the other being used for executing an auxiliary motion whereby one part of one clutch is connected by suitable linkage to one part of the other clutch and the first clutch part is blocked in released position and serves as a support for operating the second clutch.

In a loom when defects occur in the fabric during the weaving process, the weaving operation is automatically stopped by some known method, for example as disclosed in Patent No. 2,546,833 and then brought by the attendant into a position suitable for correcting the weaving defect. After correcting the defect, for instance, after replacing a broken weft thread or knotting a broken warp thread, the loom is brought again into a suitable position from which weaving can be resumed. In sufficiently powerful looms the drive for the loom may be used to effect these operations. When weaving defects occur, the loom must be disconnected from the motor driving it, and an auxiliary operating device must be connected to the loom motor for starting and completing the auxiliary movement and, if necessary, bringing the loom again into a suitable position for resuming normal weaving. In conventional systems, the couplings and control members required for these operations often take up considerable space and are of extremely complicated construction, so that supervision and care of the machine are not always as they should be and attendance is rendered difficult.

With the method and means according to the present invention, these drawbacks are avoided by assigning several operating functions to one and the same operating member, permitting a simpler and more compact construction of the operating device, so that it may be fitted on an existing loom without difficulty.

When weaving defects occur as, for instance, when a weft or warp thread breaks, not only is the weaving operation interrupted automatically and within a very short time, but, because of the new method with its different steps and the use of brake and clutches and a simple operation carried out by the attendant or even automatically by the loom drive, the machine can be caused to move backward into a position suitable for removing the defect. Thus, for instance, in the case of warp thread defects, actuation of the same operating member suffices to bring the loom from any open shed position to the closed shed position suitable for the work to be done. In this way the work of the attendants is considerably facilitated, interruptions in service are shortened, and defects due to errors in manipulation are reduced to a minimum.

The individual operation of the warp let-off control, of the cloth beam control or take-up, of a shedding mechanism or of the pick finder, whereby the shedding operation takes place normally or reversely, has already been proposed. In accordance with the present invention, however, the control groups for these purposes are operated and controlled from a centralized means so that it is unnecessary for an operator to attempt to supervise several different operations simultaneously. The invention relates to a weaving machine or loom in which the auxiliary movements are derived from a common operating shaft, especially movements for actuating individual mechanisms, for example, operating warp let-off, the shedding mechanism, and the cloth take-up. In performing the present invention, the mechanism for facilitating correction of weaving defects is driven from the same common operating shaft, and all mechanisms of the loom derive their po..er from a common source.

A shedding mechanism of the cam-operated or eccentric type is employed, for example as disclosed in Patent No. 2,592,820 of April 15, 1952, in which there is a normal drive shaft, rotation of which produces the requisite motion of the harness for raising and lowering the healds in the proper sequence, and there is a second control shaft, rotation of which through a fixed angle causes all the heald eyes to be brought to the same position so as to close the shed or straighten the warp. In carrying out the invention in case of a warp defect, the normal loom operation is stopped and the control shaft of the shedding mechanism is rotated sufficiently to close the shed. The shed closing operation may be initiated manually, or the stopping of the loom after the initiation of the shed closing mechanism may take place automatically in response to a warp thread failure. In case of a weft thread failure, the normal weaving operation is stopped after the shedding mechanism is disconnected from the normal loom operating shaft, being connected instead to a shaft driving the shedding mechanism in the reverse direction, but deriving its power from the same source as in normal weaving operation. The shed reversing or pick finding operation is initiated manually.

Mechanisms according to the invention are illustrated by way of example and diagrammatically in the accompanying drawings, in which:

Fig. 1 is a schematic diagram representing a loom as seen from the end frame where the controls are located.

Fig. 1A is a fragmentary view representing in longitudinal section concentric operating shafts according to the invention and clutch means controlling the operation of the shafts;

Fig. 1B is a detailed view of a warp detector showing a cross section of the conductor rods carrying the warp detector.

Fig. 2 is a schematic front view of the loom according to Fig. 1 looking at the cloth beam end.

Fig. 3 shows diagrammatically a system according to the invention having a manually operated pair of couplings which are represented in their positions as during normal weaving.

Fig. 4 shows the system according to Fig. 3 in position after a defective weft thread insertion and with the loom at rest.

Fig. 5 shows the couplings after a second movement of the operating member in the opposite direction, with the loom at rest.

Fig. 6 schematically shows a portion of the mechanism according to the invention including a pair of clutches automatically operated for closing the shed and semi-automatically operated for returning the shed to its previous (openshed) position.

Fig. 7 schematically illustrates the mechanism according to Fig. 6 in the position of the first operating step after breakage of a warp thread and with the other parts of the loom at rest.

Fig. 8 illustrates the mechanism according to Figs. 6 and 7 in the position of the second operating step.

Fig. 9 is a perspective illustration of a part of a clutch suitable for use in the mechanism according to the invention.

Fig. 10 is a perspective illustration of a part of a clutch, which part mates with the part shown in Fig. 9.

Fig. 11 is a perspective view of the parts shown in Figs. 9 and 10 in coupling position.

Fig. 12 shows the parts of the clutch of Fig. 9 and Fig. 10 in initial disengaged position.

Fig. 13 shows the parts of the clutch of Fig. 9 and Fig. 10 in more advanced disengaged position.

Fig. 14 is a schematic diagram of a shedding mechanism showing the adjustment for producing normal motion of the heddle harness in response to rotation of the driving shaft for the mechanism.

Fig. 15 is a fragmentary diagram of the apparatus of Fig. 14 which shows the parts in a position in which the warp is straightened or the shed is closed regardless of the angular position of the driving shaft.

Figures 1 and 2 shows a loom having two side frames 1 and 2. On the frame 1 is arranged a source of power common to all individual loom operating movements, for instance an electric motor 3, a transmission shaft or the like, connected through belts, chains, or the like 4 to two friction discs 5 of a friction clutch. The friction discs 5 are loose on the main shaft 6. Between the discs 5 which also act as fly wheels is a friction wheel 7, mounted on and fixed to the main shaft 6. The main shaft 6 has a band brake 8 which brings the loom to rest quickly when the friction clutch 5, 7 has been disengaged. The main shaft 6 is connected to the shuttle picking mechanism which is located in the casings 9, 9a on the inner sides of the frames 1 and 2. A part of the driving mechanism projects from casing 9a and drives by means of the bevel gear 10, a shaft 11 arranged at a right angle to the main shaft 6. The picking unit may be of a type known to those skilled in the art, for example, it may embody features described in Patent No. 2,099,627 to Rossmann or my Patents Nos. 2,160,338 and 2,160,339.

Parts which must be acted upon when rectifying weft failures are, for instance, the warp beam 30 with its drive and consequently the warp threads 31, the fabric 37 and the cloth beam 39. Other parts which must be moved are the heddles 330 and the harness operating mechanism 22.

The sleeve 12 forming one part of a claw coupling according to Patent No. 2,592,819 of April 15, 1952, is connected to the shaft 11 so that it turns with the shaft but can be displaced axially, the sleeve 12 being pressed to the right, in Figures 1 and 3 to 5, by a spring 15. The second part of the coupling is the ring 13 which is fixed to the chain wheel 14 and is free to rotate with it on the shaft 11 but cannot move in axial direction. The coupling 12, 13 is engaged during normal weaving operation and has a pawl 16 so constructed and arranged that when the coupling 12, 13 is disengaged the pawl 16 falls between the sleeve 12 and the ring 13, thus making it impossible during a determined angle of relative rotation, for instance 360°, for the driving sleeve 12 to engage with the driven part 13 bearing chain wheel 14. When the two coupling parts 12 and 13 have moved through this angle of relative rotation the pawl 16 is automatically withdrawn and the coupling 12, 13 is re-engaged owing to the action of the spring 15. A clutch which is suitable to be used in the mechanism according to the invention is illustrated in Figs. 9 to 13 and will be described later. The clutch is identical to that disclosed in Patent No. 2,592,819.

The sprocket wheel 14 is connected through the chain 19 to the chain wheels 17 and 18, the three wheels being arranged in a triangle (see Figure 2). The chain wheel 17 is fixed to the auxiliary shaft 20, which is carried in bearings 21 disposed outside of the frame member 2. The chain wheel 18 drives the harness operating or shedding mechanism 22 which is also located outside of the frame 2, for instance, an eccentric or other conventional mechanism which causes the movements of the heddles 330. A suitable mechanism is shown in Figures 14 and 15, which correspond to Figures 1 and 2 of Patent No. 2,592,820, and will be described later.

From the warp beam 30, the warp threads 31 are led over the tensioning beam 32 and through the warp stop motion feelers 33 which act when an irregularity occurs, and through the eyes of the heddles and the reed 35. After the weft thread 36 has been inserted and then beaten up into the fabric by the reed 35, the fabric 37 thus produced is led over the guide roller 38 to the cloth beam 39 on which it is wound.

The movement of the wrap beam is effected by the operating shaft 20, through the bevel gear 24 on the shaft 20 which meshes with the bevel gear 23. The bevel gear 23 is connected to a friction disc 25, which cooperates with a disc 26 keyed on the vertical shaft 27 and adjustable along it. The vertical shaft 27 carries a worm 29 which drives the warp beam 30 through gear 28.

The tension beam 32 is carried at both ends in rockers 43 which are pivoted on brackets 44 on the frames 1 and 2. On the ends of the rockers 43 opposite to the bearings of the tension beam 32, one end of rods 42 are pivoted, their other ends being pivoted on the bell-crank lever 41 which is connected to the head 40 of the disc 26. To the rockers 43 are also attached tension springs 45 which are in equilibrium with the tension forces of the warp threads 31. The position of the disc 26 adjusts itself automatically in accordance with the position of the tension beam 32.

One end of the auxiliary shaft 20 is provided with a worm 46, by means of which the cloth beam 39 is driven through a gear 47 and gears 47', 47'', and 37'.

While the weft thread 36 is being inserted into the shed, the weft stop motion feeler or finger 48 rests yieldingly on the taut weft thread. The finger 48 is operatively connected with the central stop motion shaft 59 and actuates it when the feeler 48 swings clockwise due to the absence or breakage of the weft thread 36. An example of a mechanically operated weft stop motion control is described in my Patent No. 2,386,706 wherein the weft feeler or detector 75 and the central stop motion shaft 58 correspond to the elements 48 and 59, respectively, of the present application. An electrically operated weft stop motion control is described in patent No. 2,546,833.

A suitable mechanism, represented schematically by rods 60', 60 connected to cranks on the shaft 59, Fig. 2, is provided which is responsive to counterclockwise rotation of the shaft 59 (as seen in Fig. 1) to disengage the main clutch 7 between the drive or flywheels 5 and the main shaft 6 and thereupon apply the quick-acting brake 8 for stopping the loom while the motor 3 continues to rotate the flywheels 5. Such a mechanism being known to those skilled in the are need not be described in detail. One form of such mechanism is mentioned in Patent No. 2,099,627 to Rossmann where the brake 82 corresponds to the element 8 of the present application.- A suitable mechanism is disclosed in Patent No. 2,055,228 to B. W. Brouwer in which shaft 51 is the equivalent of shaft 59 of the mechanism according to the present invention.

The bevel gear 49 which carries the coupling parts 54, 55 of the auxiliary device and is mounted on the operating shaft 20 meshes with the bevel gear 51 on the vertical motor-driven operating shaft 50. Gear 49 is loose on the auxiliary shaft 20 and the shaft can be rotated in a direction opposite to that of gear 49 which is not displaceable axially on the shaft. The shaft 50 is connected through the bevel gears 52 and the shaft 53 to the loom drive 3 (see Figure 2). On the sides of the bevel gear 49 are claw clutch rings 54 and 55. By means of clutch members 54 and 55, when the friction clutch 5, 7 is disengaged and the loom is consequently at rest, the shaft 20 can be driven by the loom motor 3 in order to carry out auxiliary movements, and in particular to correct defects in weaving. The clutch ring 55 on the bevel wheel 49 cooperates with the claw sleeve 57 which rotates with the auxiliary shaft 20 but is axially displaceable on it.

The claw clutch sleeve 56 cooperates with the clutch ring 54 and rotates with the hollow splined shaft 61, along which it can be moved axially, the amount of axial displacement into the disengaged position being limited by the collar 62 on the shaft 61. As shown in Figures 1A and 6 to 8, the hollow shaft 61 is loose on the shaft 20 and positioned between the bevel wheel 49 and ends within the clutch member 69 fixed on the frame 2.

At the left side (Figures 1, 1A and 6) of the collar 62, which is fast on the hollow shaft 61, is a chain wheel 64 and a collar 65, all being fast on the hollow shaft 61. When the coupling 54, 56, for executing an auxiliary motion, is engaged, the chain wheel 67, which is fast on the shed closer actuating shaft, of the harness operating machine 22 is driven through chain 66 by the sprocket wheel 64 for moving the heddles by the harness operating machine 22 which is shown in Figures 14 and 15 from any operating position into the closed shed position, or from the closed shed position into the open shed position for resuming normal operation.

At the left end (Figures 1, 1A and 6) of the hollow shaft 61 is the claw sleeve 68 which turns with the shaft and is axially displaceable on it. A spring 71 is inserted between the claw sleeve 68 and the collar 65 which is fast on shaft 61. The clutch member 69 is fixed and not rotatable on the frame 2 and has a blocking pawl 70 which falls inwards between the claw sleeve 68 and the clutch member 69 when the sleeve 68 is disengaged. The clutch 68, 69, 70, 71 is of the same construction as clutch 12, 13, 16, 15 and of the type disclosed in Patent No. 2,592,819. After relative rotation of the parts of the coupling through a determined angle, the pawl 70 is automatically withdrawn and, due to the action of the spring 71, the coupling 68, 69 is automatically engaged for normal weaving. The claw sleeves 56 and 68 have annular grooves rotatably supporting rings 72 and 73 respectively, which are connected by a toggle linkage comprising links 75, 76 which are jointed at 74. To the link 76 is articulated one end of a rod 77 whose other end is swingably connected with an actuating member 78, for instance, a pedal, which is carried in a bearing 79 and held in its upper position by the spring 80.

A fork 81 engages the claw clutch sleeve 12 and is carried by a two-armed operating lever 82 which swings about a fixed pivot 83 and is connected through a pin 84 to the lever 85 (see Figure 3). Between the pivot 83 and the pin 84, one end of the safety control rod 86 is connected to the lever 82, the other end of the rod 86 resting against the bell-crank lever 87 which is fixed on the loom stop motion shaft 59. By this means, the stop motion shaft 59 is held in a locked position by the disengaged or not completely engaged coupling 12, 13 which is engaged only during normal weaving operation. In this locked position, the coupling 5, 7 cannot be engaged and the brake 8 (Figure 2) cannot be released, and the motor 3 can only be coupled to the loom when the coupling 12, 13 is completely engaged. This automatic control device eliminates the possibility of mistakes in operation by the attendants.

Connected to the free end of the intermediate lever 85 is the control rod 88 which extends through a stationary guide 89 and has a stop 90 limiting the movement of the control rod 88 to the right (Figures 1 and 3). The rod 88 has an arm 91 which engages an annular groove in the coupling sleeve 57. From a pivot 133 on the intermediate lever 85 extends a control rod 92 which is actuated through a fork 93 and shaft 94 by the handle 95. A spring 115, which is tensioned when the coupling 12, 13 is disengaged, is attached to the rod 92.

On the safety control rod 336 is an electric contact member 98 cooperating with a stationary contact plate 99. Warp thread feelers 33, which are designed as contact bridges, and illustrated in Figure 1B are included in an electric circuit 100 which is controlled by the switch 98, 99 and in which is also a solenoid 101. The core 102 of the solenoid 101 is connected through motion-transmitting levers and rods 103, 104, 105, 106 to a pawl-lever 107 pivoted on the operating rod 77. To the vertical rod 104 is attached a spring 108 which acts against the pull of the solenoid. With the circuit 100 closed and the armature 102 drawn into the solenoid 101, the pawl-lever 107 takes up a position in which it engages the rocking-lever 109, which is kept rocking by the eccentric drive 110. The eccentric 110 is on the shaft 111 which is driven through spur gear wheels by the shaft 53, Figure 2. The armature 102 is provided with a mushroom-head 112, which is engaged from below by a fork 113 on one arm of a two-armed lever whose other arm is connected through the rod 114 to the bell-crank lever 87 of the main stop-motion shaft 59.

The mechanism for reversing the shedding operation, as is necessary, for instance, to change an incorrectly inserted weft thread, is illustrated diagrammatically in different operating positions in Figures 3 to 5.

Referring to Figure 3, during normal weaving the auxiliary shaft 20 is connected through chain 19 and coupling 12, 13 to the loom driving shaft 11 which operates the picking mechanism in casing 9a. The clutch 5, 7 controlled by the control stop-motion shaft 59 is engaged, so that the main shaft 6 is driven by the motor 3 and there is a forward driving connection between the latter and the loom driving shaft.

If the weft thread 36 breaks, the weft stop-motion finger 48 swings into the position shown in Figure 4 and closes switch 200 and energizes through conduit 58 the solenoid 150 whose armature 151 is connected with and actuates the stop-motion shaft 59, thereby disengaging clutch 5, 7 and applying brake 8. Reversal of the mechanism for operating the heddles 330 can now be initiated by the attendants.

For this purpose operating means are provided comprising a handle 95 which is turned from the position shown in Figure 3 to the position shown in Figure 4, whereby the rod 92 is moved to the right and the spring 115 is tensioned. This movement caused bending of the linkage comprising the levers 85 and 82 to take up the positions shown in Figure 4, and the lever 85, since the stop 90 lies against the support 89, swings about the pivot 135 and the lever 82 swings on the stationary pivot 83. The coupling part 12 is thereby pushed to the left against the spring 15 and disengaged from the clutch ring 13 whereby pawl 16 drops between the two parts 12, 13 of the clutch and prevents their re-engaging. By the movement of the lever 82 about the pivot 83, the safety control rod 86 has been pushed to the right, holding lever 87 and the central stop-motion shaft 59 in operative position. If handle 95 is released, it will swing back into its initial position as shown in Figure 3, owing to the action of the spring 115, whilst the rod 92 is moved to the left. The lever 85, whose temporary fulcrum is the connecting pin 84 since the coupling 12, 13 is locked in the disengaged position by pawl 16 swings into the position shown in Figure 5. The control rod 88 connected to the end of the lever 85 also moves to the left and through the arm 91 moves the claw clutch member 57, which is axially movable but not rotatable on shaft 20, to engage the clutch member 55 which is fixed on the bevel gear 49 of the auxiliary drive. This gear is driven by the loom motor 3 through a reverse connection comprising a reducing gear in casing 3a (Figure 2) and the shafts 53 and 50 and rotates in the opposite direction to the shaft 20 when the latter is driven by shaft 11 during normal weaving. The shaft 20 with the sprocket wheel 17 then turns backward and through the chain 19 and the sprocket wheel 18, the drive of the harness operating mechanism 22 is also reversed. Simultaneously, rotation of the warp beam 30 and of the cloth beam 39 is also reversed.

The chain 19 also imparts backward motion to the chain wheel 14 which is free to rotate on shaft 11. After the chain wheel 14 with the clutch ring 13 has turned backwards relatively to the clutch member 12 through an angle, for instance, 360°, the pawl 16 automatically swings out so that the clutch member 12 is moved to the right by the spring 15 and the coupling 12, 13 is re-engaged and the coupling 55, 57 used for executing an auxiliary motion during idling of member 14 is disengaged for normal weaving. The stroke made by the coupling sleeve 12 when clutch 12, 16 is re-engaged is transferred to the operating fork 81 and is sufficient to swing lever 82 about stationary pivot 83 and with it lever 85 back into the positions shown in Figure 3. The intermediate lever 85 thereby swings about the pivot 133 at the end of the rod 92 and the control rod 88 is moved to the right until its stop 90 abuts the fixed part 89 and disengages through the fork 91 the clutch member 57 from the clutch member 55. The auxiliary mechanism is thus uncoupled from the motor driven shaft 53 and shaft 11 is again in driving connection with shaft 20 and the normal loom drive which can again be started by operating the handle 63 (Figures 1 and 2). This causes the clutch 5, 7 to engage and the brake 8 to be released so that the main shaft 6 of the loom drive starts rotating.

Figures 6 to 8 diagrammatically show the different operating positions of a mechanism by means of which the heddles 330 can be brought from any open-shed position into the closed-shed position and then again into the open-shed position, as is necessary, for instance, when correcting a broken warp thread 31.

In the position shown in Figure 6, the electric circuit 100 is interrupted because the warp stop-motion feelers or warp thread detectors 33 acting as contact bridges rest on the wrap threads 31 and are held above their electric contact positions. If a warp thread 31 breaks, the respective feeler or rider 33 drops on the conductor rods 136 (Figure 1B) and closes the circuit 100 and the solenoid 101 is energized and pulls armature 102 down. In this way the lever 113 and the bell-crank lever 87 connected to it by link 114 is brought into the position shown in Figure 7 and sets the loom stop-motion shaft 59 in motion. This disengages the coupling 5, 7 through member 60' (Figures 1 and 2) and applies the brake 8 through member 60, whereby the main shaft 6 and the loom are brought to rest. The two-armed lever 103, connected at one end to armature 102, has been swung into the position shown in Figure 7 and through control means comprising the rods and lever 104, 105, 106 has brought the pawl-lever 107 into its operative position and tensioned spring 108 attached to the rod 104. The pawl 107 is now in the path of the rocking lever 109 which is oscillated by the eccentric 111 and shaft 110. The lever 109 when moving upwards presses upwards the pawl 107 and actuates operating means comprising a rod 77 connected with pawl 107 whereby the toggle linkage comprising levers 75, 76 is made to form an angle at the joint 74. The right end of lever 76 is pivoted on ring 72 which is rotatable on clutch sleeve 56 whose movement to the left is limited by the shaft-collar 62. Consequently, the lever 75 pivoted on the ring 73 and with it the clutch sleeve 68 are drawn to the right and member 68 is disengaged from the stationary clutch member 69. The blocking pawl 70 drops between the clutch members 68 and 69 and prevents their re-engaging. By that time, lever 109 moves downward permitting downward movement of rod 77 due to the action of spring 80 and causing linkage 75, 76 to be straightened. Since the blocking pawl 70 prevents the clutch sleeve 68 from moving towards the left, it acts as a base from which members 75, 76 are extended, and the ring 72 and with it the clutch member 56 are moved to the right into engagement with the clutch member 54 on the rotating bevel gear 49. The parts of the mechanism thus take up the positions illustrated in Figure 8. The clutch member 56 rotates in a direction contrary to that of the auxiliary shaft 20 and rotates the hollow shaft 61 which is now connected with it. The sleeve 65 with the sprocket wheel 64 keyed on the shaft 61 also rotates and through the chain 66 drives the sprocket wheel 67, which brings the shedding mechanism 22 and the heddles 330 (Figure 1) into the closed shed position and moves rod 336 to the right as seen in Figures 1, 8, and 15. Thereby switch 98, 99 is opened and solenoid 101 de-energized, so that pawl 107, due to the action of spring 108, is swung to a position in which it cannot be engaged by lever 109. The hollow shaft 61 revolves with the clutch member 68 until the blocking pawl 70 is swung out, whereupon the clutch member 68 is moved to the left (Figures 1 and 6) by the spring 71. The clutch member 56 is then withdrawn from the clutch member 54 which continues to rotate, and the clutch member 68 engages the stationary part 69 of the clutch. Rotation of the hollow shaft 61 by the driving shaft 50 is thus interrupted.

The gear ratio of the sprocket wheels 64 and 67 is chosen so that the rotation of the hollow shaft 61 to swing out the blocking pawl 70 corresponds to the movement of the shedding mechanism from the open-shed into the closed-shed position.

In this way, without any assistance from the attendants, but only by means of a warp stop-motion feeler 33 the loom is made to move into the closed shed position, in which the warp thread error may be removed.

The open-shed position required for starting the loom again is effected by actuating a member 78 fulcrumed of 79, i. e. pressing it against the action of spring 80 out of the position of rest shown in Figure 6 into the position shown in Figure 7. Then the levers 75, 76 are bent as shown in Figure 7 and draw the clutch member 68 out of the stationary part 69 of the clutch, and this clutch is prevented from engaging again by the blocking pawl 70 which swings in. When member 78 is released, the spring 80 pulls the two levers 75, 76 again into the extended position shown in Figure 8, whereby the clutch member 56 is engaged with the rotating clutch member 54. The shaft 61 with the chain-wheel 64 is thus directly driven from the loom motor 3 through auxiliary drive means comprising a reducing gear 3a and the shaft 53 and operates the shedding mechanism 22 for placing the heddles 330 into the open-shed position. When this is effected, the blocking pawl 70 is swung out again by the rotation of the clutch member 68 through a corresponding angle. The spring 71 causes the clutch member 68 to move to the left and through the levers 75, 76 draws the clutch member 56 out of the clutch member 54, so that the drive of the sprocket wheel 64 is interrupted. The mechanism thus returns into the position shown in Figure 6 in which the loom is again ready to be started which may be effected, for example, by manipulating the handle 63 (Figures 1 and 2). Member 78 may comprise a rod 78' (Figure 2) extending along the width of the loom in easy reach of the operator.

Though the improved operating mechanism is more especially adapted for use in looms, it may also be employed with advantage in other machines such as, for example, machines for preparation of warp or weft threads and machines for finishing fabrics. In such machines, the performance of auxiliary movements, for instance, the moving back of a part into a position previously occupied so as to bring into operation a device previously used, may be carried out in a simple manner.

An advantage of the auxiliary shaft 20 (Figure 1), which can be coupled at will to the shaft 11, for normal operation, or to the auxiliary drive 49 to 53, consists in simplifying the operation of several pairs of clutches for two or more auxiliary motions for rectifying irregularities in different parts of the manufacturing process, as, for instance, the replacing of a broken weft thread or the knotting of a broken warp thread. Not only the driving but also the mounting is very simple, as the pair of couplings 54, 56 and 68, 69 are directly mounted on the auxiliary shaft 20. Even the coupling parts 56, 57 are mounted with their common counter-coupling part 54, 55 of the auxiliary drive 49, 53 on the shaft 20.

Figures 9 to 13 illustrate a clutch which is suitable for use in the mechanism according to the invention.

One half of the clutch as shown in Figure 10 has a claw ring 201 corresponding to parts 13 and 69 in Figure 1 and is fitted with a sprocket wheel 202 which corresponds to the sprocket wheel 14 in Figure 1, and a hole 203 for a shaft, as 11 or 61 in Figure 1, the ring 201 having a claw 216 which has inclined sides 215 adjoining the claw gap 211. From the face of ring 201 projects a pin 212 parallel to the axis of rotation of the clutch; this pin carries a pawl 213 corresponding to pawls or detents 16 and 70 in Figure 1 and formed as a blocking member. The blocking portion 213a of the pawl 213 is pressed into its blocking position by the leaf spring 214 fixed to the claw 216. The thickness H of the pawl 213 measured in the axial direction is greater than the axial extension $h$ of claw 216.

Referring to Figure 9, the second half 204 of the coupling is formed as a sleeve corresponding to sleeve 12 and 68 in Figure 1 and having internal splines 207 which sleeve is mounted on shaft 205 corresponding to shafts 11 and 61 in Figure 1 and having external splines 206 and a collar 208 so that the part 204 will turn with the shaft but can be displaced thereon axially. In order to displace the coupling sleeve 204 on the shaft 205 the sleeve has an annular groove 210 for a control fork as 81 in Figure 1 or the like as the ring 73 in Figure 1. The end of the coupling part 204 facing the claw ring 201 (Figure 10) has a claw 217 projecting in axial direction and having inclined sides 220 adjoining the claw gap 218.

The dimensions of the claw 217 and of its gap 218 are such that, when the sleeve is engaged with the part shown in Figure 10 the claw 217 is in the gap 211 and the claw 216 lies in the gap 218 in the coupling half 204 and the inclined operating flanks 215 and 220 engage each other as is obvious from Figure 11 which shows the clutch in engaged position with pawl 213 riding on the outside of part 204.

The claw 217 (Figure 9) is cut away at 219. The depth in the axial direction of the contact surface 219a in the recess 219 corresponds at least to the difference $(H-h)$ of the thickness of the claw 216 and of the pawl 213. The running-on surface 221 on claw 217 prevents wear of the edge 213b of the pawl portion 213a when it slides on to the cylindrical outside of the coupling half 204.

Referring to Figures 11, 12 and 13, the coupling operates as follows:

By means of a control fork engaging the annular groove 210, the coupling sleeve 204 may be disengaged from the ring 201 by withdrawing it in axial direction until the clearance between the face 219a of the sleeve 204 and that of ring 201 is greater than H and the blocking pawl 213 can drop thereinbetween. Pawl 213 cannot fall in front of face 217 because collar 208 prevents excessive movement of member 204 to the left. The coupling ring 201 is free to turn on shaft 205 which lies in the bore 203, but the ring cannot be displaced axially on the shaft 205. The spring 209 between the collar 208 on the shaft 205 and the sleeve 204 is compressed when the latter is in disengaged position. If the pressure in the axial direction which effected disengagement is released, re-engagement of the coupling is prevented by pawl 213. In disengaged position, the claw ring 201 and the sprocket wheel 202 can rotate in the direction of arrow 222 (Figure 12) whereby the face of claw 216 runs on to that of the claw 217 (Figure 13) and the part 213a is relieved from the pressure of the spring 209. With further rotation of the ring 201 in the direction 222, the axial face of claw 216 runs on that of claw 217, whereby the area of contact increases. The blocking pawl 213 thus comes into the free space between the claw gaps 211, 218 and portion 213a falls inwards under the action of the spring 214.

Upon further relative rotation of parts 201 and 204, coverage of claws 216 and 217 is reduced and pawl 213 runs on the approach surface 221 of claw 217. When rotating the ring 201 further, pawl 213 runs onto the cylindrical outside of the sleeve 204 and when the ring 201 has nearly made a complete revolution claw 217 slides into the gap 218 and the sleeve 204 moves under the action of the spring 209 to the right until the claw sleeve 204 comes again into its initial engaged position, Figure 11. The claws are already so far in the gap of the mating parts when pawl 213 reaches recess 219 that the face 213c of the pawl is beyond face 219a, in axial direction, and cannot be caught by it.

Figure 14 illustrates a shedding mechanism which may be used in connection with the system according to the invention. The mechanism has two driving cams 301, 302, which are keyed one behind the other on the shaft 303 carried in the bearings 303a and connected to the loom drive by sprocket wheel 18 and chain 19 as shown in Figure 1. The cam 301 cooperates with roller 304 and the cam 302 with roller 305. The rollers 304, 305 are carried by an intermediate driving member or rocker 306, which is formed for instance as a rocker and equipped with an extension 307. The rocker 306 is held in a bearing 308 supported by link 309 and connected to a bracket 310 which is mounted upon an eccentric 312. The link 309 is hinged to the stationary pin 311.

To the link 309 the stop motion bar 336 is pivotally connected which bar cooperates with a part of the safety loom stop-motion mechanism, for example, bellcrank lever 87. This mechanism is not shown as it does not form part of the present invention. The bar 336 is controlled by the position of the bearing 308 and prevents the loom being put into service when the eccentric 312 is displaced from normal loom operating position.

The eccentric 312 is carried by shaft 313 which is supported by bearing 314 and connected through the chain 66 and sprocket wheel 64 to the hollow shaft 61 shown in Figure 1.

The driving rod 317 is equipped with a head 318 carrying several pivots 319 for selectively connecting the head to the rocker 306. The other end of the driving rod 317 is pivotally connected at 320 to the bell crank lever 321 which is carried on the fixed pin 322. The bell crank lever 321 is connected by means of the driving rod 325 to the bell crank lever 324 supported on the fixed pin 323. The bell crank levers 321, 324 are each connected by means of connecting links 326 to bars 327 which pass through guides 327a and are connected to the heddle frame 34. This frame has an upper and lower heald carrier 329 on which the healds 330 provided with eyes 331 are arranged. The warp threads 31 are led through the eyes 331.

In normal weaving operation, the shaft 303 is driven by chain 19 and shaft 11 (Figure 1) and rotates in the direction of the arrow 333 and the cam 302 presses on the roller 305 and moves the rocker 306 into its end position 306a. The mechanism 317, 321, 325, 324, 326, 327 brings the frame 34 into its lowest position. When the rocker is in the end position 306a, the cam 301 presses on the roller 304, the rocker 306 moving counter-clockwise and the frame 34 being displaced again into its upper end position. The continued rotation of the cams 301, 302 imparts a continuous reciprocating movement to the harness 34. The cams required for the drive of a desired number of heald frames 34 are keyed on the driving shaft 303. If a warp thread 31 breaks, the loom is brought to rest in a conventional manner by a control member coming into operation, for instance, the warp thread stop-motion. The cams 301, 302 and the heald frame 34 positively connected to them then come to rest in some position which is not predetermined. For removing the weaving defect, for instance, for drawing in a new warp thread 31, it is preferable that the shed be closed; this is done by moving all frames 34 into their middle position between the upper and lower end positions.

As shown in Figure 15, the heald frames 34 required for forming the shed are brought out of any working position into the position of rest corresponding to the preferably closed shed, which for instance may be the middle position of the heald frames, by the coupling 54, 56 being engaged and the eccentric disc 312 being connected to the aforedescribed auxiliary drive. Clutch 68 to 70 being of the one position type and the transmission ratio of chain drive 64, 66, 67 being 2:1, the eccentric disc 312 rotates through 180°, so that it is brought into the position 312a, and the bracket 310 is moved into the position 310a, through a distance corresponding to double the eccentricity. As soon as this new position has been reached, the coupling 54, 56 automatically interrupts operation of chain 66. The pin 308 is brought by the motion of the eccentric 310 into the position 308a, and the rod 309 into the position 309a. Thereby the rod 336 is displaced into the position 336a and prevents operation of the loom or the shaft 303. The rocker 306 is drawn to the stops 334, 335; this corresponds to the middle position 306a, where the frames 34 form the closed shed. The rollers 304, 305 are spaced from the cams 301, 302 and in the positions 304a, 305a.

When the weaving defect has been removed, the eccentric disc is again brought into the working position shown in Figure 14 by the aforedescribed operation of member 78 and engaging the coupling 54, 56; the rollers 304, 305 then again come on to the cams 301, 302 and bring the heald frames 34 into the position which they had when the loom was stopped. Thereby also the control rod 336 is again brought back into its normal operating position, and normal weaving operation can be resumed.

The time for rectifying irregularities, such as weaving defects, is lost time for weaving and must be shortened as much as possible. Especially for fabrics with a complicated pattern, a weaving defect means the loss of a determined length of fabric if such a defect is not corrected at once.

Thus the advantage of pairs of couplings according to the invention resides in the simplification of the change-over from normal weaving to rectifying operation; by manipulation of only one operating handle, in a loom equipped as described, closing the shed is possible in every phase of weaving operation. In some cases, there is no moment in the weaving operation at which all heddles are in their middle position. As this position is absolutely necessary for knotting a broken warp thread, this position can only be obtained if, as above described, the operating connection of the shedding mechanism and the heddles is interrupted, as shown in my application Serial No. 715,515, now Patent No. 2,592,820. Even if several weaving steps are to be eliminated and the warp and the fabric brought back to a certain extent, no error can take place and for each step only one handle 95 must be moved.

I claim.

1. A loom operating device comprising first and second interrelated clutches, each having first and second engageable and disengageable relatively movable parts, resilient means for normally holding the parts of the first clutch in engagement for normal loom operation, the parts of the second clutch being normally disengaged, the second part of the first clutch and the first part of the second clutch being axially relatively movable, the said first clutch having a pawl for temporarily preventing return movement of the second part upon disengagement thereof from the first part and while the clutch parts move relatively to each other, and a toggle linkage interconnecting said parts with respect to axial movement, whereby bending the linkage counteracts the pressure of said resilient means and disengages the first clutch, said pawl temporarily locking the second part of the first clutch in displaced position and forming a rest affording movement of said linkage in opposite direction for engaging said second clutch.

2. Apparatus as in claim 1 wherein there is a loom driving shaft connected to the second part of the first clutch, there is an auxiliary shaft normally driven by the first part of the first clutch, there is a shedding mechanism driven by said auxiliary shaft, and there is a loom motor with a forward connection to the loom driving shaft, and a reverse connection to the second part of the second clutch.

3. Apparatus as in claim 1 wherein the first part of the first clutch is stationary, there is a shed closer having an actuating shaft, there is a driving connection between said actuating shaft and the second part of the first clutch and the first part of the second clutch, and there is a power drive connected to the second part of the second clutch.

4. Apparatus as in claim 2 including a warp thread detector having a pair of electric contacts which it is adapted to close upon failure of a warp thread, and electrically controlled apparatus connected to and actuated by the loom motor for bending said toggle linkage having a control circuit in series with said contacts.

5. In weaving machinery, an auxiliary shaft, a member in the said machinery to which said auxiliary shaft is normally to be secured, a first clutch having first and second normally engaged disengageable parts, the first part being connected with said member, a second clutch having first and second engageable normally disengaged parts, a power shaft connected to the second part of said second clutch, and a reciprocating clutch operator having a connection for disengaging the first clutch upon the forward stroke and engaging the second clutch on the return stroke.

6. In a loom for weaving having a source of power common to all individual loom operating movements, an auxiliary mechanism comprising a normal loom operation clutch engaged during normal weaving and another clutch disengaged during normal loom operation, each clutch having two parts adapted to engage one another, and operating means connected to one of said parts of one clutch and to one of said parts of the other clutch and adapted to be operated in two different directions and when operated in one direction disengaging said normal loom operation clutch and when operated in the other direction engaging said other clutch.

7. The mechanism defined in claim 6 comprising means responsive to a weaving irregularity and connected with and adapted to operate said operating means.

8. The mechanism defined in claim 6 comprising oscillating means connected to and oscillated by said source, means responsive to a weaving irregularity connected with said operating means and adapted to be temporarily engaged by said oscillating means and affording temporary operation of said operating means by said oscillating means upon such engagement.

9. In a loom for weaving having a source of power common to all individual loom operating movements, a mechanism comprising an auxiliary drive permanently connected with said source, two normal loom operation clutches engaged during normal weaving, two auxiliary operation clutches disengaged during normal weaving, each clutch having two parts adapted to engage one another, two of said parts individually pertaining to said auxiliary operation clutches being permanently inter-connected and forming a double clutch member driven by said auxiliary drive, one part of each of said normal loom operation clutches being individual linked to one of the parts of an auxiliary operation clutch other than the parts forming said double clutch member.

10. In a loom for weaving having a source of power common to all loom operating movements, a mechanism comprising a normal loom operation clutch engaged during normal weaving, an auxiliary operation clutch disengaged during normal weaving, each clutch having two parts adapted to engage one another, operating means connected to one of said parts of one clutch and to one of said parts of the other clutch, oscillating means connected to and oscillated by said source, and control means responsive to a weaving irregularity connected with said operating means and adapted to be temporarily engaged by said oscillating means and affording temporary operation of said operating means by said oscillating means upon such engagement.

11. In a loom for weaving, individual operating mechanisms, a source of a power, loom drive means connected with said mechanisms, clutch means interposed between said source and said drive means, a normal loom operation clutch engaged during normal weaving, auxiliary drive means connected with said source, an auxiliary clutch connecting and disconnecting said auxiliary drive means and one of said mechanisms and linked with said normal loom operation clutch, control means responsive to weaving irregularities and actuating said clutch means, and safety control means connected with and responsive to the operating conditions of said normal loom operation clutch and connected with said first control means.

12. In a loom for weaving, individual operating mechanisms, a source of power, loom drive means connected with said mechanisms, clutch means interposed between said source and said drive means, a normal loom operation clutch engaged during normal weaving, auxiliary drive means connected with said source, an auxiliary clutch connecting and disconnecting said auxiliary drive means and one of said mechanisms and linked with said normal loom operation clutch, first control means responsive to weaving irregularities and being connected to and actuating said clutch means, and safety control means connected with and responsive to the operating conditions of one of said operating mechanisms and connected with said first control means.

13. In a loom for weaving, individual operating mechanisms, a source of power, loom drive means connected with said mechanisms, clutch means interposed between said source and said drive means, a normal loom operation clutch engaged during normal weaving, auxiliary drive means connected with said source, an auxiliary clutch connecting and disconnecting said auxiliary drive means and one of said mechanisms and linked with said normal loom operation clutch, first control means responsive to weaving irregularities and being connected to and actuating said normal loom operation and said auxiliary clutch as well as said clutch means, and safety control means connected with and responsive to the operating conditions of one of said operating mechanisms and connected with said first control means.

ALBERT MOESSINGER.

References Cited in the file of this patent

UNITED STATES PATENTS

| Number | Name | Date |
|---|---|---|
| 467,036 | Maertens | Jan. 12, 1892 |
| 727,533 | Bond | May 5, 1903 |
| 891,618 | Hollingworth | June 23, 1908 |
| 1,156,007 | Hollingworth | Oct. 5, 1915 |
| 2,160,338 | Moessinger | May 30, 1939 |
| 2,355,609 | Stuer | Aug. 15, 1944 |
| 2,421,539 | Clarke | June 3, 1947 |

FOREIGN PATENTS

| Number | Country | Date |
|---|---|---|
| 386,174 | Great Britain | Jan. 12, 1933 |
| 446,844 | Great Britain | May 7, 1936 |
| 447,700 | Great Britain | May 25, 1936 |
| 474,669 | Great Britain | Nov. 1, 1937 |
| 615,728 | Great Britain | Jan. 11, 1949 |
| 615,742 | Great Britain | Jan. 11, 1949 |